US011219269B2

(12) United States Patent
Garbujo et al.

(10) Patent No.: US 11,219,269 B2
(45) Date of Patent: Jan. 11, 2022

(54) CO-INJECTION MOULDED SPORTS BOOT

(71) Applicant: ROSSIGNOL LANGE S.R.L., Treviso (IT)

(72) Inventors: Giuseppe Garbujo, Montebelluna (IT); Tiziano Posato, Maser (IT); Massimo Poloni, Montebelluna (IT); Armando Zandonà, Maser (IT)

(73) Assignee: ROSSIGNOL LANGE S.R.L., Treviso (IT)

( * ) Notice: Subject to any disclaimer, the term of this patent is extended or adjusted under 35 U.S.C. 154(b) by 569 days.

(21) Appl. No.: 15/178,662

(22) Filed: Jun. 10, 2016

(65) Prior Publication Data
US 2016/0360823 A1 Dec. 15, 2016

(30) Foreign Application Priority Data

Jun. 11, 2015 (EP) .................................... 15425042

(51) Int. Cl.
*B29D 35/14* (2010.01)
*A43B 5/04* (2006.01)
(Continued)

(52) U.S. Cl.
CPC .......... *A43B 5/0482* (2013.01); *A43B 1/0072* (2013.01); *A43B 5/0411* (2013.01);
(Continued)

(58) Field of Classification Search
CPC ... A43B 5/0482; A43B 5/0496; A43B 5/0486; A43B 5/0411; B29C 45/22; B29C 45/1676; B29C 45/1642; B29C 45/2708; B29C 2045/167; B29C 2045/1692; B29D 35/142; B29D 35/04; B29D 35/0018;
(Continued)

(56) References Cited

U.S. PATENT DOCUMENTS 3,950,483 A * 4/1976 Spier ..................... B29C 45/164
264/241
4,245,410 A * 1/1981 Molitor .................... A43B 7/12
36/117.1
(Continued)

FOREIGN PATENT DOCUMENTS

CA 2 374 148 A1 12/2000
EP 0 823 323 A1 2/1998
(Continued)

OTHER PUBLICATIONS

European Search Report and Written Opinion dated Dec. 10, 2015 issued in counterpart application No. EP15425042; w/ English partial translation and partial machine translation (11 pages).

*Primary Examiner* — Katharine G Kane
(74) *Attorney, Agent, or Firm* — Westerman, Hattori, Daniels & Adrian, LLP

(57) ABSTRACT

Sports boot element of which the wall includes at least two different plastics materials (15, 16), the wall having (i) a first zone (11) including the two different plastics materials within its thickness, the first plastics material (15) forming two layers of the wall constituting the internal and external faces of the said wall, and the second plastics material (16) being interposed between the two layers of the first plastics material (15), and (ii) a second zone (13) including only the second plastics material (16).

26 Claims, 7 Drawing Sheets

(51) Int. Cl.
  *B29C 45/16* (2006.01)
  *B29D 35/04* (2010.01)
  *B29D 35/00* (2010.01)
  *A43B 1/00* (2006.01)
  *B29C 45/22* (2006.01)
  *B29C 45/27* (2006.01)
  *B29K 105/00* (2006.01)
  *B29K 105/06* (2006.01)
  *B29K 307/04* (2006.01)
  *B29K 309/08* (2006.01)
  *B29L 31/50* (2006.01)

(52) U.S. Cl.
  CPC .......... *A43B 5/0486* (2013.01); *A43B 5/0496* (2013.01); *B29C 45/1642* (2013.01); *B29C 45/1676* (2013.01); *B29C 45/22* (2013.01); *B29D 35/0018* (2013.01); *B29D 35/04* (2013.01); *B29D 35/142* (2013.01); *B29D 35/146* (2013.01); *B29D 35/148* (2013.01); *B29C 45/2708* (2013.01); *B29C 2045/167* (2013.01); *B29C 2045/1692* (2013.01); *B29K 2105/0058* (2013.01); *B29K 2105/06* (2013.01); *B29K 2307/04* (2013.01); *B29K 2309/08* (2013.01); *B29K 2995/007* (2013.01); *B29K 2995/0021* (2013.01); *B29L 2031/501* (2013.01)

(58) Field of Classification Search
  CPC ................ B29D 35/148; B29D 35/146; B29K 2995/0021; B29K 2995/007; B29K 2105/0058; B29K 2105/06; B29K 2105/04; B29K 2105/08; B29L 2031/501
  See application file for complete search history.

(56) References Cited

U.S. PATENT DOCUMENTS

| | | | | |
|---|---|---|---|---|
| 4,907,353 | A | * | 3/1990 | Wittmann ............ A43B 5/0411 280/615 |
| 5,667,737 | A | * | 9/1997 | Wittmann ............ A43B 1/0027 264/245 |
| 6,457,265 | B1 | * | 10/2002 | Lepage .................... A43B 5/04 36/115 |
| 2001/0001909 | A1 | | 5/2001 | Sand |
| 2005/0081408 | A1 | * | 4/2005 | Chaigne .................. A43B 5/04 36/117.6 |
| 2006/0064904 | A1 | * | 3/2006 | Confortin ................ A43B 5/04 36/117.1 |

FOREIGN PATENT DOCUMENTS

| | | |
|---|---|---|
| JP | 2-126801 A | 5/1990 |
| WO | 2014/136051 A1 | 9/2014 |

\* cited by examiner

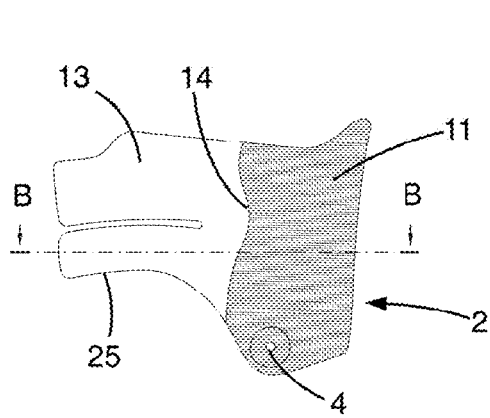
Figure 19
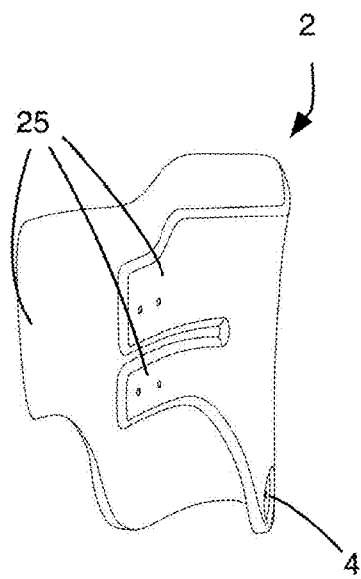
Figure 32
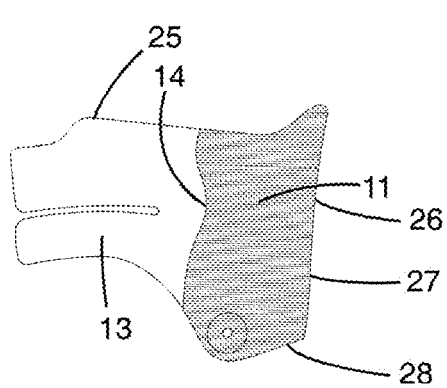
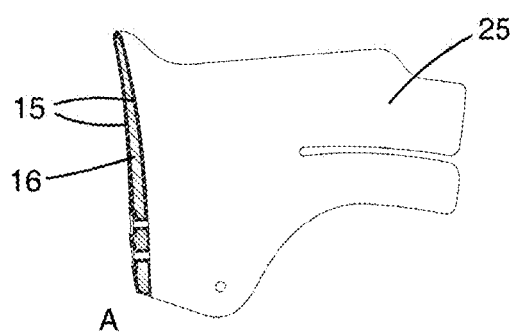
Figure 20
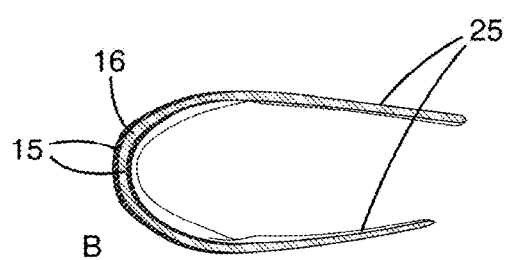
Figure 22
Figure 21

CO-INJECTION MOULDED SPORTS BOOT

The invention relates to a sports boot element such as all or part of a shell, a lower shell or a cuff or a tongue, notably of an alpine skiing or cross-country skiing ski boot, and to a sports boot as such comprising such an element. It relates in particular to all or part of a ski boot. It also relates to a method for manufacturing such a sports boot element.

A ski boot requires on the one hand, significant strength and rigidity and, on the other hand, a high level of comfort. Specifically, such a boot experiences numerous loadings when in use and has therefore to have good strength. A high degree of rigidity is also needed in order to achieve good boot performance as the boot, being the interface between the skier and the ski, transmits the loads from the skier to the ski in order to guide the latter. However, the constraints in terms of comfort are just as stringent. The boot has notably to be flexible enough that it allows the skier to open it in order to put it on and take it off, allow him to bend his knees forwards in order to ski, and provide him with sufficient comfort despite being used in extreme temperature conditions and in a wet and harsh environment.

It is known practice for these requirements to be met using boot elements comprising one or more plastics materials. In general, the boots comprise rigid plastic zones situated on the outside, these partially or fully covering a more flexible inner boot or comfort upper that provides the comfort.

A first method for manufacturing a sports boot element or sports boot of the prior art is to manufacture the various plastic sub-elements separately by injection moulding and then assemble them mechanically. The disadvantage with such a method is that it requires a long manufacturing time and is expensive because it requires a specific mould for each sub-element, requires the various manufactured sub-elements to be stored separately, then requires a step of mechanically assembling these sub-elements.

Another method for manufacturing sports boots in the prior art is to use the two-shot injection moulding technique which involves manufacturing a boot wall by injection of a first layer of a first plastics material and then injection overmoulding, directly onto this first layer still in place on the internal part of its mould, after it has cooled and hardened and after the external part of the mould has been changed, a second layer made of the same material or from a plastics material said to be "compatible" with that of the first layer, so that the two plastics materials naturally weld together at their superposed surfaces. Using this technique, enough time is left before the second injection for the first plastics material to have had time to harden before the second injection: the two injected layers thus remain distinct, do not mix, are juxtaposed and/or superposed. This solution makes it possible to obtain boots of which the wall has mechanical properties and aesthetics that can vary at their various points by virtue of the combination of two materials which may have different mechanical properties such as rigidity, and varying appearances.

However, this method entails an additional specific external mould. Specifically, before the second material is injection overmoulded, it is necessary to change the external part of the mould, this entailing additional production cycle time and additional mould manufacture costs. Another disadvantage associated with this method lies in the cohesion of the material at the boundary between the two materials. Specifically, it is found that the bond between the two materials can be weak.

Hence, there is a need to improve existing sports boots and the method of manufacturing same.

A first subject of the present invention is a sports boot that is easy to put on and take off, in order to achieve acceptable levels of comfort while at the same time offering good rigidity spread across the appropriate zones in order to obtain a boot that performs well to suit its use.

A second subject of the present invention involves offering a sports boot the method of manufacturing of which remains simple and inexpensive.

A third object of the invention is to propose a sports boot of attractive aesthetic appearance.

According to the concept of the invention, the wall of a sports boot element comprises:
  a first zone comprising two different plastics materials within its thickness, the first plastics material forming two layers of the wall constituting the internal and external faces of the said wall, and the second plastics material being interposed between the two layers of the first plastics material, and
  a second zone comprising only the second plastics material.

The invention is more specifically defined by the claims.

These objects, features and advantages of the present invention will be set out in detail in the following description of some particular embodiments illustrated on an alpine ski boot given by way of nonlimiting example with reference to the attached figures in which:

FIG. 19 depicts a side view of a ski boot cuff according to a first embodiment of the invention.

FIG. 20 depicts a rear view of the ski boot cuff according to the first embodiment of the invention.

FIG. 21 depicts a side view in section on a vertical mid-plane of the ski boot cuff according to the first embodiment of the invention.

FIG. 22 depicts a plan view in section on a horizontal plane of the ski boot cuff according to the first embodiment of the invention.

FIG. 32 depicts a front perspective view of the ski boot cuff according to the first embodiment of the invention.

In the description that follows, we shall use the same references for the various alternative forms of embodiment to denote the same features. The vertical direction refers to the direction from the bottom upwards, namely from the sole of the boot towards the top of the boot. The horizontal direction refers to the direction perpendicular to the vertical direction, parallel to a plane on which the sole of the boot rests.

Furthermore, the external face of a boot element will refer to its surface facing towards the outside of the boot and the internal face will refer to a surface oriented towards the inside of the boot, on the side of the foot.

Figure 1:
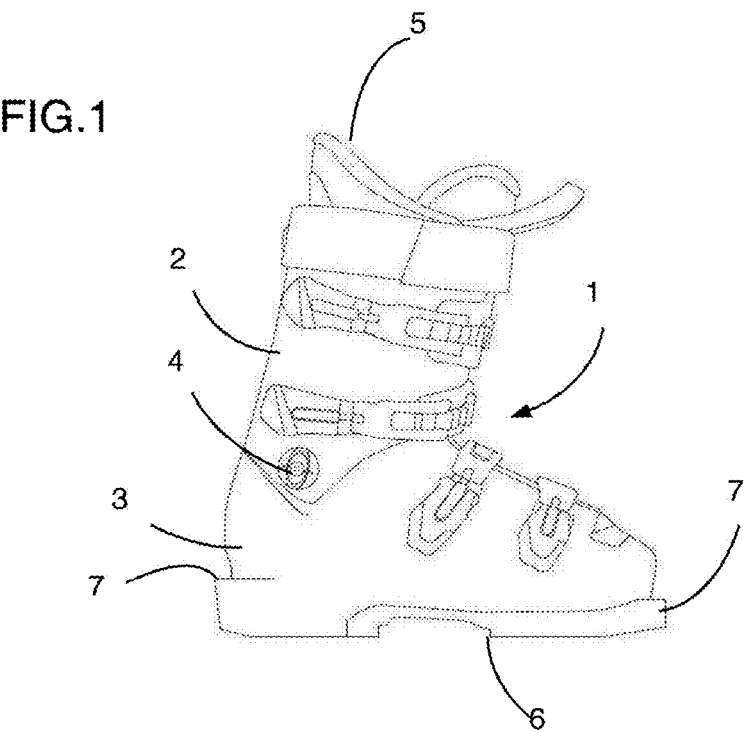
FIG. 1 depicts a side view of a ski boot according to one embodiment of the invention.

FIG. 1 illustrates an alpine ski boot 1 according to one embodiment of the invention, which comprises a rigid outer shell formed of several injection moulded plastics materials as will be detailed hereinbelow, notably comprising two elements: a cuff 2 articulated to a lower shell 3 about a hinge 4. The lower shell 3 extends from the outsole 6 up to the hinge 4 that hinges and connects it to the cuff 2 in the vertical direction. A comfort inner boot 5 is inserted into the rigid shell. The sole 6 is extended towards its two, front and rear ends by side walls at boot toe and side walls at boot heel, called in a more simple way curb 7 (or lip), of a format suited to collaborating with the jaws of a ski boot binding device.

The outer surface of the outsole 6, in contact with the ground during walking, can be produced directly as one piece with the lower shell or added on, for example by using added heel and/or toe pieces.

The embodiments of the invention that will be described rely on a method for manufacturing a boot element, such as, for example, a lower shell 3 or a cuff 2 of a ski boot, which comprises at least two injection-moulding steps using a co-injection moulding principle to inject two different plastics materials respectively. Different refers to materials having different mechanical characteristics, such as, for example, different Young's modulus values, and/or different hardnesses. As an alternative or in addition, this difference may be visible, the two materials then being different colours.

The method used here is a co-injection moulding method in which at least two plastics materials are injected into the same mould, via at least one same injection point through which at least two different materials pass in succession. These two materials are, in particular, plastics materials, possibly fibre-reinforced plastics materials, for example glass-fibre-reinforced, carbon-fibre-reinforced, etc. materials.

Co-injection moulding relies on at least two successive steps of injecting plastics materials into a single mould, these two steps being sufficiently close together that the second material injected through the first material injected imbricates therein. For that, the first material 15 is injected into the mould. It remains sufficiently fluid at the time of injection of the second material 16 through the first material into the same mould, notably at the internal surface thereof which remains hotter for longer than its external surfaces, which cool more quickly in contact with the walls of the injection mould. The imbrication mentioned manifests itself in two ways. First, the second injected material partially penetrates the layer formed by the first material injected with the first injection. Specifically, because this first layer is still liquid and fluid enough, the second material penetrates across the internal surface of this mentioned layer under the effect of the significant energy imparted as it is injected and spreads into the thickness of the first layer, finally forming a so-called "sandwich" wall zone in which the second material injected is enclosed between two layers of the first material injected. Next, the second material injected carries part of the first material of the first injection beyond the position it reached at the time of the first injection, as far as a frontier (limit, boundary, border) zone where the two materials are substantially mixed and alternated, before the second material continues on its way alone beyond this frontier zone. This then creates a frontier zone or intermediate zone between the two materials which has no clean or linear frontier. Notably, because the first material is carried along irregularly, it may form "flame" shapes in a direction defined by the direction of injection of the second material, at the frontier beyond which the first material injected disappears. In this frontier zone, the second material may in isolated points reach the external walls of the element possibly alternating with the first material. Likewise, in this frontier zone, the first material could at isolated points partially penetrate the central part of the second material. In order to optimize the behaviour of the boot it is advantageous to reduce the size of the frontier zone. Between two co-injected elements according to the invention, under the same theoretical conditions and in the same mould, the position of the frontier zone may fluctuate by approximately one centimetre. Thus, this solution also makes it possible, in the case of materials of different colours, to achieve an original and attractive aesthetic effect. Comment: the co-injected materials therefore in places form superposed layers constituting a sandwich; these layers formed by such a method are welded together to form a monobloc wall. These layers of the wall are not physically separated.

Figure 2:
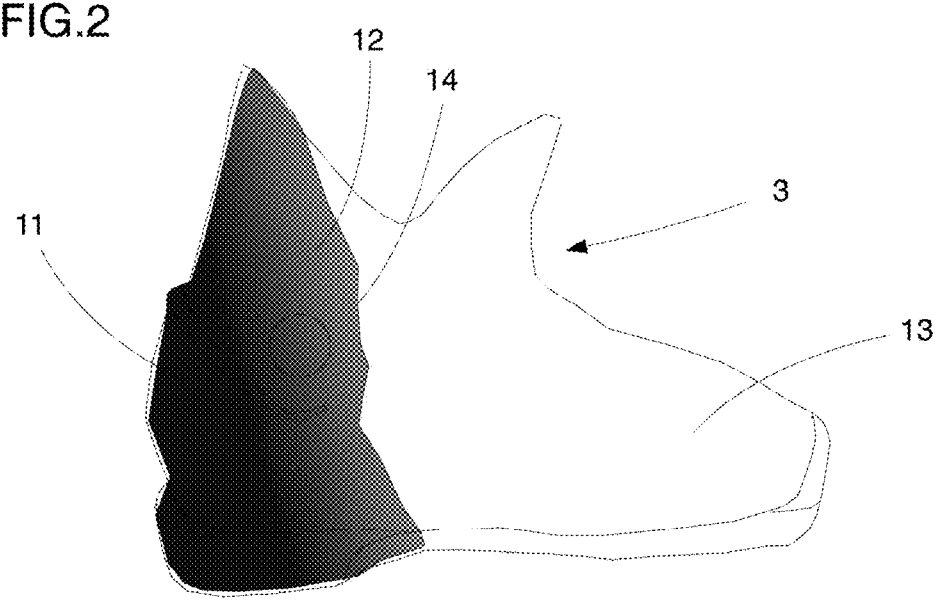
FIG. 2 depicts a side view of a ski boot lower shell according to one embodiment of the invention.
Figure 3:
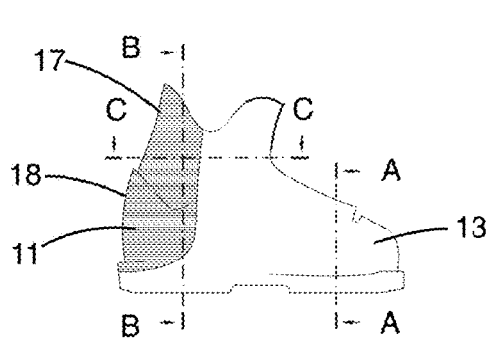
FIG. 3 depicts a side view of a ski boot lower shell according to a first embodiment of the invention.
Figure 6:
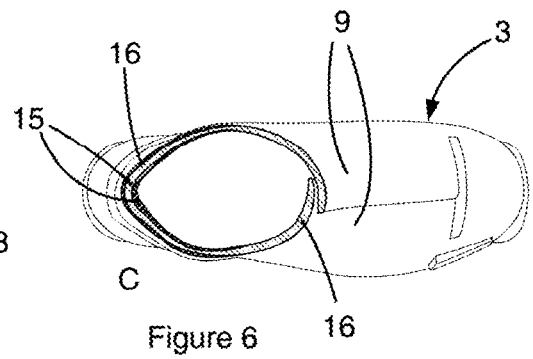
FIG. 6 depicts a plan view in section on a horizontal plane at the upper part of the ski boot lower shell according to the first embodiment of the invention.

By way of example, FIG. 2 illustrates a ski boot lower shell 3 obtained according to one embodiment of the invention, similar to the second embodiment described later on in conjunction with FIGS. 7 to 10. The two materials used are depicted in the figures as two different colours, respectively dark and white, and can both be seen on the external face of the lower shell. These two materials constitute the wall of the lower shell 3 but are distributed in a particular way on the external and internal faces of the lower shell, and in the thickness of the wall. In a rear first zone 11 of the lower shell 3, the first material occupies the external face of the lower shell, whereas in a front second zone 13 the second material occupies the external face of the lower shell. As explained previously, the frontier 14 between the two zones 11, 13 is not clean, has discontinuities and/or a form or a line with significant non-smooth fluctuations or irregularities thus delimiting a surface on each side that is not completely convex or concave. Furthermore, the intermediate zone 12 at the frontier 14 comprises a mixture of the two materials, the effect of this being passed on in the form of a zone of intermediate and fluctuating rigidity or of a degraded colour and/or of a random alternation between the two colours. Thus, by using two materials with different mechanical properties and also different colours, the method makes it possible to achieve an interesting aesthetic appearance. As an alternative, the zones 11, 12, 13 could occupy any other surface of the lower shell. The first zone 11 consists of a "sandwich" type wall which contains the second material (depicted as white) intercalated between two layers of the first material (depicted as dark). This first material constitutes the two, external and internal, faces of the wall of the lower shell 3 which respectively form the exterior face of the shell and the interior face of the shell situated facing the foot. Comment: the second material is therefore not visible from the outside and from the inside of the lower shell in the first zone 11 because it is contained between two layers formed of the first material injected. The second zone 13 comprises only the second material throughout the thickness of the wall of the lower shell, and therefore becomes visible both from the outside and from the inside of this zone of the lower shell 3.

According to one embodiment, the temperature of the injection mould is raised between 50 and 60° C. during the injections. In addition, the time between the two injections is comprised between 3 and 6 seconds, advantageously 4 or 5 seconds. This time can be lengthened if the temperature of the mould increases, or conversely may be shortened if it decreases.

Furthermore, the two successive injections need to be performed at the same point in the mould, from one and the same injection point. For that, a traditional injection-moulding machine with two injection nozzles is used.

As an alternative, there may be several injection points, at least one of the injection points receiving two successive injections according to the co-injection moulding technique explained hereinabove in the case of each of them. In order to permit greater control over the spread of material in the mould, the other injection points may receive either the injection of just one of the two materials or the two successive injections, according to the co-injection moulding technique. For example, in the case of two injection points being used for co-injection moulding, the first material is injected first of all via the two injection points, then the second material is injected in its turn via the same two injection points, through the first material injected. By way of example, the embodiment depicted in FIG. 2 can be obtained by two injection points positioned at two different heights in the rear zone of the lower shell, each one receiving the two successive injections according to the co-injection moulding technique explained hereinabove.

The second material therefore extends continuously from the rear end of the first zone 11 to the front end of the second zone 13, but is not visible on the lower shell 3 except in the second zone 13.

As mentioned above, the two materials used in the manufacturing method are different. This difference may become apparent as a result of different colours, in order to obtain the visual effect explained hereinabove in conjunction with FIG. 2. The term "colour" is to be interpreted in the broad sense, namely to refer to any particular aspect, including a transparent or translucent appearance. Advantageously, two materials of different rigidities are used in order to obtain a wall the rigidity of which varies according to the zones of the boot element, in order to achieve a compromise chosen according to the performance and comfort requirements recalled hereinabove for the boot element. Comment: these two materials of different rigidities may or may not be of different colours.

Advantageously, the first material is more rigid than the second and is preferably positioned in those zones of the boot element that require greater rigidity: these zones will be detailed in the examples described later on. The second material is more flexible and will be the only material found in the zones requiring greater flexibility. Advantageously, the difference in rigidity between the two materials is greater than or equal to 5 ShD. By way of example, the first material may be polyurethane with a hardness comprised between 50 and 70 ShD inclusive, preferably between 55 and 60 ShD inclusive, or any other plastics material of equivalent hardness, whereas the second material may be polyurethane with a hardness comprised between 40 and 60 ShD inclusive, preferably between 45 and 50 ShD inclusive, or any other plastics material of equivalent hardness. The two materials may be identical but preferably of different hardness, or may be different. For example, the first material may be polyurethane and the second polyamide or a polyether block amide. As an alternative, the plastics material used may be different, such as a polyolefin. With this approach, the zone comprising a "sandwich" type wall of the boot element has the particular feature of having a hardness that varies according to the thickness of the wall, notably having an intermediate part that is not as hard as the two, internal and external, layers of the sandwich in the case where the first material injected is more rigid than the second.

In addition, the quantity of each of the two materials used is not arbitrary. Specifically, the quantity of first material injected needs to be less than the quantity at which the first material would occupy the entire surface or almost the entire surface of the mould, in which case the second material injected would be unable to reach the external faces of the wall in the second zone, and in which case the first material would impose a relatively constant rigidity on the wall of the boot or in any case a rigidity that varied over a range markedly smaller than that desired by the invention. Thus, the quantity of first material injected is such that it does not extend over the entire surface of the injection-moulded element, and preferably extends over less than 75%, or even less than 50%, of the surface of the injection-moulded element. It is found that one advantageous embodiment is to inject a quantity of first material representing by weight 50% or less of the total weight of the boot element after it has been finalized, or even 40% or less or 30% or less of this total weight. The second injection of the second material may then make up all of the remaining weight, or even just part of this weight if more than two injected materials are planned.

In all the alternative forms of embodiment that will be described in greater detail in conjunction with FIGS. 3 to 31, the first material injected is depicted in a dark colour and is more rigid and harder than the second. The first and second materials may be chosen to be the same colour or to be different colours. Naturally, other alternative forms that have not been depicted may easily be obtained. For example, the first and second zones may be produced in different parts of the boot. In all the illustrations, the frontier 14 is represented by a line that has been smoothed for the sake of simplicity, something which is not entirely true to life as explained earlier. FIGS. 3 to 18 illustrate several embodiments of a ski boot lower shell and FIGS. 19 to 32 depict several embodiments of a ski boot cuff.

Figure 4:
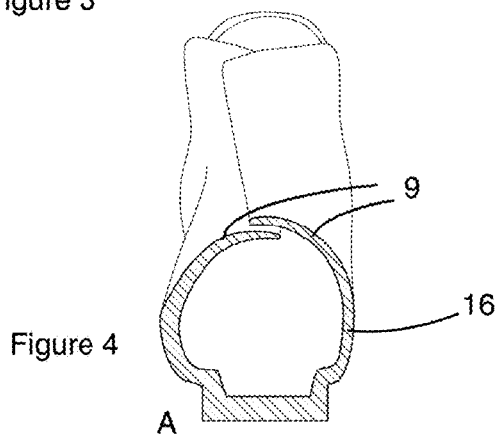
FIG. 4 depicts a front view in cross section on a vertical plane at the front part of the ski boot lower shell according to the first embodiment of the invention.

FIGS. 3 to 6 illustrate a first embodiment of a ski boot lower shell 3. In this embodiment, the first zone 11 comprising the "sandwich" wall particularly visible in the sections of FIGS. 4 and 5 in which the two materials 15, 16 can be distinguished, extends at the rear part of the lower shell. The second material 16 is present in the central part of the sandwich, the first material 15 forming the two outer layers of the sandwich, the two, internal and external, faces of the wall of the lower shell. It allows the creation of a wall that is rigid, because of the presence of the first material 15 injected, which guarantees firm retention of the skier's foot and gives the boot sufficient rigidity in the rear part thereof. The frontal part, notably in the region of the instep, is obtained by two flaps 9 of a material that is more flexible because these are formed only by the second material 16 injected as illustrated in FIG. 4. In this embodiment, two injection points 17, 18 arranged at two different heights of the rear part of the lower shell are used. These two injection points receive the two materials in succession.

Figure 5:
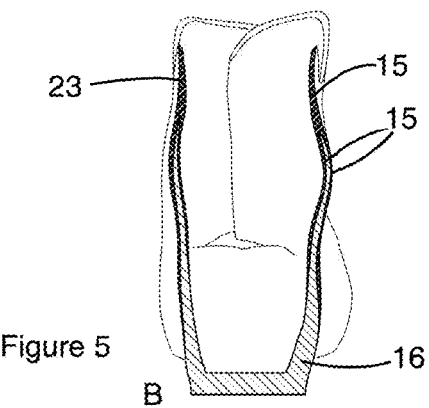
FIG. 5 depicts a rear view in cross section on a vertical plane at the rear part of the ski boot lower shell according to the first embodiment of the invention.
Figure 7:
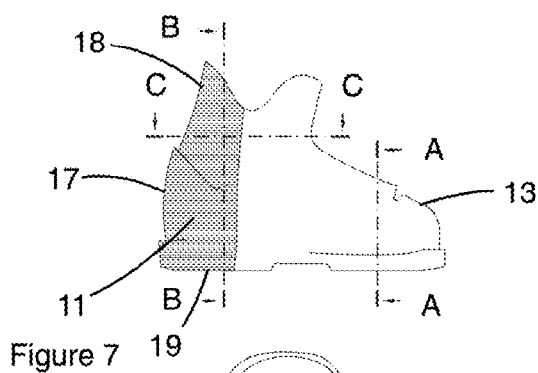
FIG. 7 depicts a side view of a ski boot lower shell according to a second embodiment of the invention.
Figure 10:
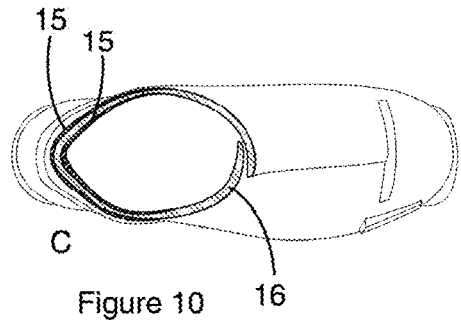
FIG. 10 depicts a plan view in section on a horizontal plane at the upper part of the ski boot lower shell according to the second embodiment of the invention.
Figure 8:
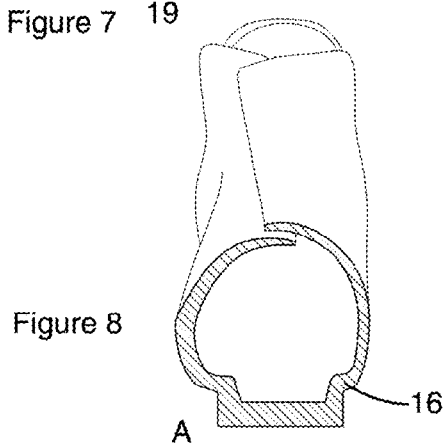
FIG. 8 depicts a front view in cross section on a vertical plane at the front part of the ski boot lower shell according to the second embodiment of the invention.
Figure 9:
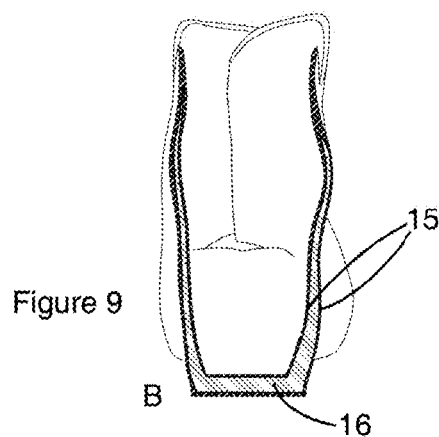
FIG. 9 depicts a rear view in cross section on a vertical plane at the rear part of the ski boot lower shell according to the second embodiment of the invention.

Comment: a fourth zone 23 in the wall of the boot comprising only the first material injected may exist, as illustrated in FIG. 5. This zone is situated near the upper end of the lower shell, which is of very small thickness. This is achieved because the mould is not very thick at this point and the first material injected cools quickly in contact with the walls of the mould thus preventing the second material from penetrating into the first material. Comment: we shall be referring to as a "sole" the lower part of the lower shell that forms at least part of the future outsole of the ski boot. In general, this sole will be supplemented by the addition of additional components to form the final structure of the outsole of the boot.

FIGS. 7 to 10 illustrate a second embodiment in which the first material extends as far as the lower part of the lower shell and also forms the rear curb of the boot and forms the sandwich structure in combination with the second material. It is obtained with two injection points 17, 18 still situated at the rear part of the lower shell, and with possibly an injection point 19 situated under the sole of the lower shell near the heel, and a quantity of first material 15 that is greater than the quantity used in the previous embodiment.

Figure 11:
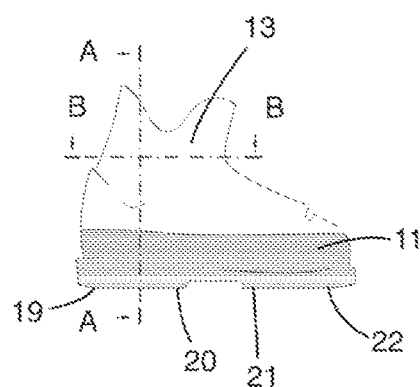
FIG. 11 depicts a side view of a ski boot lower shell according to a third embodiment of the invention.
Figure 13:
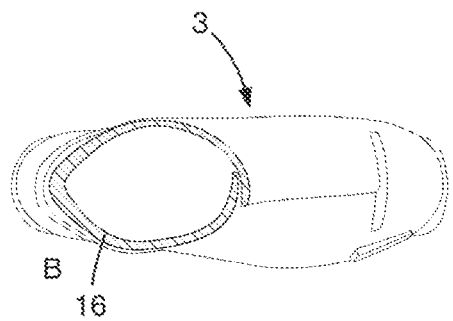
FIG. 13 depicts a plan view in section on a horizontal plane at the upper part of the ski boot lower shell according to the third embodiment of the invention.
Figure 12:
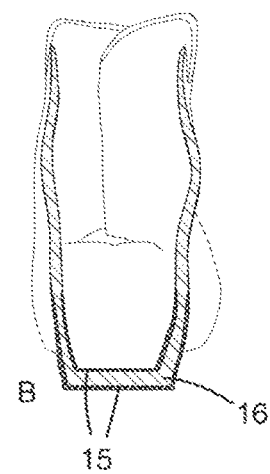
FIG. 12 depicts a rear view in cross section on a vertical plane at the rear part of the ski boot lower shell according to the third embodiment of the invention.

FIGS. 11 to 13 illustrate a third embodiment in which the first material 15 present in the first zone 11 extends in the lower part of the lower shell and notably comprises the entire sole of the lower shell. This first zone 11 comprises the sandwich structure formed by the complex consisting of the first material—second material—first material, as explained hereinabove. In particular, this first material 15 is more rigid and forms the curbs 7. For preference, the rigidity of the materials will be chosen in order to achieve a hardness for the curbs 7 of the outsole 6 that is greater than 45 ShD for children and greater than 50 ShD for adults. The sole is obtained with four injection points 19, 20, 21, 22 situated under the sole, or even by five injection points. The entirety of the upper part of the lower shell situated above the first zone 11 forms the second zone 13 and is made up of a single-material wall made of the second material 16.

Figure 14:
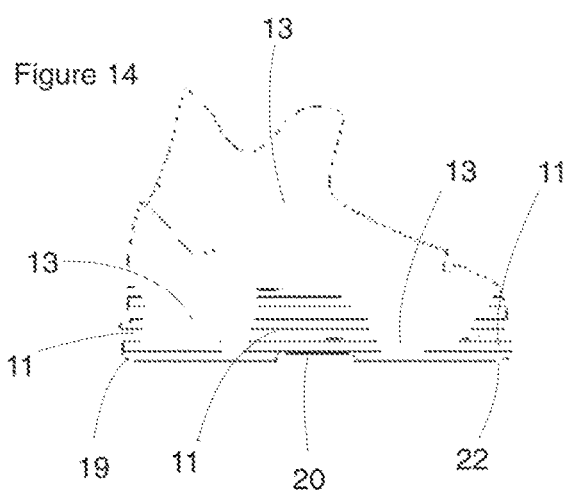
FIG. 14 depicts a side view of a ski boot lower shell according to an alternative form of the third embodiment of the invention.
Figure 15:
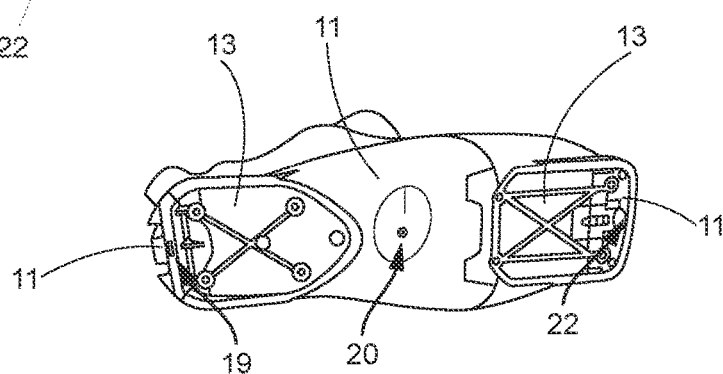
FIG. 15 depicts a view from beneath of the ski boot lower shell according to the alternative form of the third embodiment of the invention.

FIGS. 14 and 15 illustrate an alternative form of the third embodiment. In this alternative form, the more rigid first material 15 also extends in the lower part of the lower shell, but in a smaller quantity, so that it does not extend over the entire length of the lower shell. It is precisely concentrated into the front and rear curbs 7, and into the central part, at the zone 11, which appears discontinuous under the sole of the lower shell (when discounting any toe piece and heel piece there might be) and along the length of the boot. In this zone 11, the rigid first material 15 can be seen from the outside of the boot and forms the walls of the sandwich as explained earlier. There is an alternation of zones 11, 13 which means to say of rigid and flexible zones. This approach makes it possible to stiffen the zones of the lower shell which are particularly highly stressed, without excessively altering the characteristics of the lower shell. This alternative form is manufactured using three injection points 19, 20, 22 situated under the sole, one point 19, 22 at each curb and another point 20 in the central part. In particular, the first injection allows a small quantity of rigid material 15 to be injected whereas the second injection makes it possible to inject the more flexible material 16 in greater quantity. As an alternative, the sandwich rigid part may be confined only to the curb region: in that case, two injection points 19, 22, one at each curb, may suffice. As an alternative, more than three injection points may be used, in order to achieve a similar result.

Figure 16:
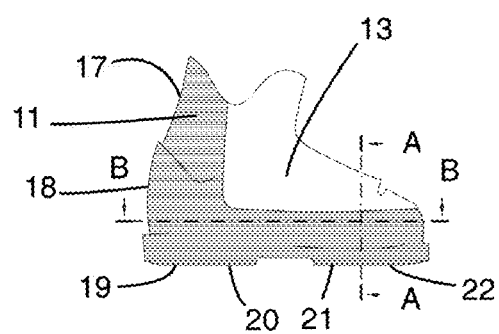
FIG. 16 depicts a side view of a ski boot lower shell according to a fourth embodiment of the invention.
Figure 18:
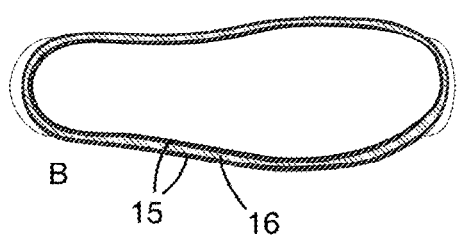
FIG. 18 depicts a plan view in section on a horizontal plane at the upper part of the ski boot lower shell according to the fourth embodiment of the invention.
Figure 17:
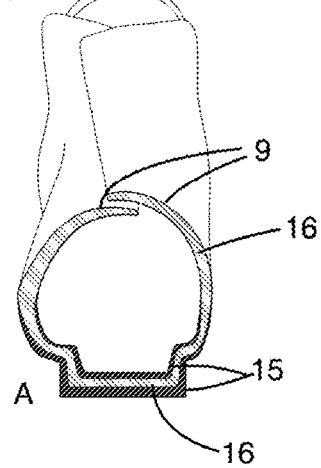
FIG. 17 depicts a front view in cross section on a vertical plane at the front part of the ski boot lower shell according to the fourth embodiment of the invention.
Figure 23:
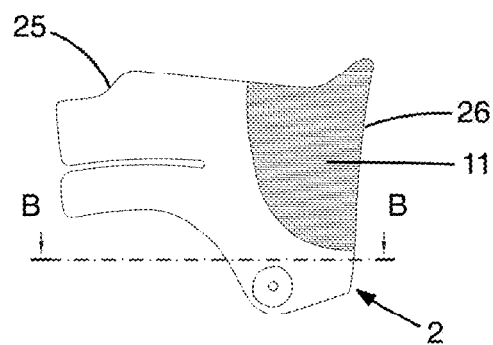
FIG. 23 depicts a side view of a ski boot cuff according to a second embodiment of the invention.
Figure 24:
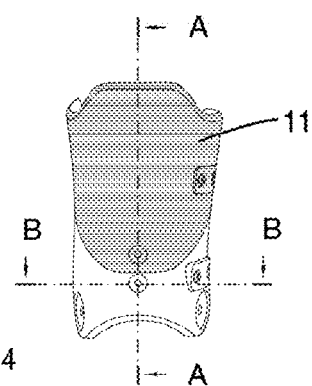
FIG. 24 depicts a rear view of the ski boot cuff according to the second embodiment of the invention.
Figure 26:
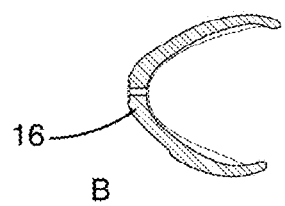
FIG. 26 depicts a plan view in section on a horizontal plane at the bottom part of the ski boot cuff according to the second embodiment of the invention.
Figure 25:
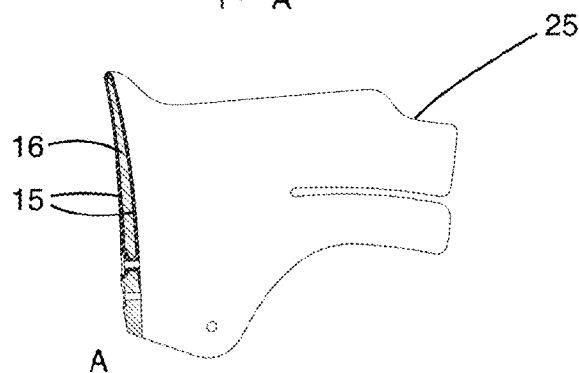
FIG. 25 depicts a side view in section on a vertical mid-plane of the ski boot cuff according to the second embodiment of the invention.
Figure 27:
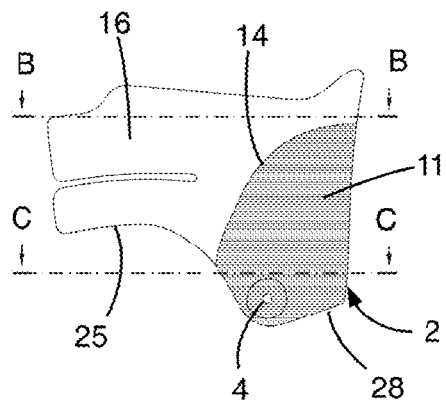
FIG. 27 depicts a side view of a ski boot cuff according to a third embodiment of the invention.
Figure 28:
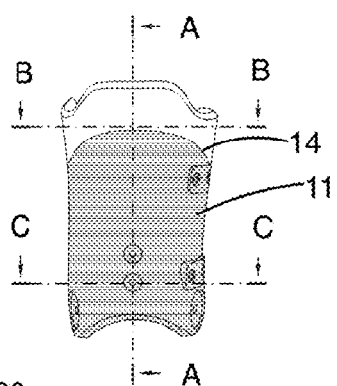
FIG. 28 depicts a rear view of the ski boot cuff according to the third embodiment of the invention.
Figure 30:
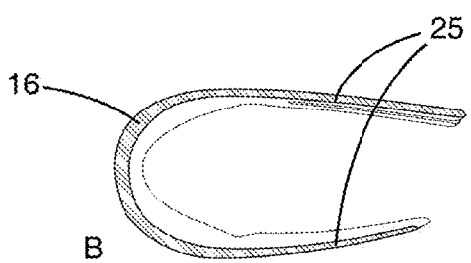
FIG. 30 depicts a plan view in section on a horizontal plane at the top of the ski boot cuff according to the third embodiment of the invention.
Figure 29:
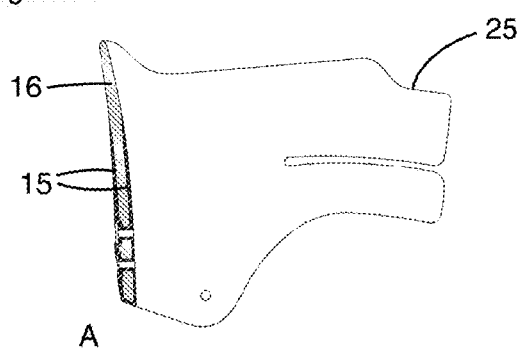
FIG. 29 depicts a side view in section on a vertical mid-plane of the ski boot cuff according to the third embodiment of the invention.
Figure 31:
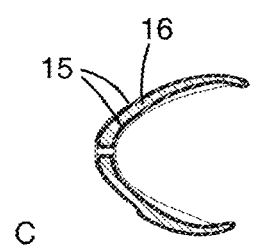
FIG. 31 depicts a plan view in section on a horizontal plane at the bottom part of the ski boot cuff according to the third embodiment of the invention.

FIGS. 16 to 18 illustrate a fourth embodiment which corresponds to the combination of the first or second embodiments with the third. The first material 15 present in the first zone 11 extends into the lower and rear parts of the lower shell. This lower shell is obtained using two injection points 17, 18 situated in the rear part of the lower shell and four injection points 19, 20, 21, 22 situated under the sole of the lower shell. Thus, in this embodiment, the most flexible part formed in the second zone 13 by the second material 16 is located only in the region of the flaps 9 in order to make the boot easier to put on.

FIGS. 19 to 22 and 32 illustrate a first embodiment of a ski boot cuff intended to surround and grip the lower leg of the user. The cuff is made up of a rear part extended at the front by two flaps 25 intended to be superposed and to flap around the front of the skier's leg. This cuff is made up of zones of variable rigidity. This cuff has a rear surface, visible in FIG. 20, over which there extends the first zone 11 which is formed by a sandwich-type wall made up of a multilayer composed, from the outside towards the inside of the wall, of the rigid material 15, of the flexible material 16, and of some more rigid material 15 again. This first zone is extended by the two lateral flaps 25. For that, the anterior part of these flaps 25 is more flexible and contains only the second material 16. Comment: the rigid first zone 11 also extends to the hinges 4 of the cuff. This cuff is obtained using three injection points 26, 27, 28 situated in the rear part of the cuff.

FIGS. 23 to 26 illustrate a second embodiment of a ski boot cuff. This second embodiment still comprises the first zone 11 at the rear part of the cuff but it does not extend as far as the bottom of the cuff. This cuff is obtained with an injection point 26 situated at the rear part of the cuff. A view in section of the upper part of this second embodiment of a cuff is the one illustrated in FIG. 23.

FIGS. 27 to 31 illustrate a third embodiment of a ski boot cuff. This third embodiment still comprises the first zone 11 at the rear part of the cuff but it extends only in the lower part of the cuff, not all the way up to the top of the cuff. Comment: the rigid first zone 11 also extends to the hinges 4 of the cuff. This cuff is obtained with an injection point 28 situated in the rear part of the cuff.

In general, the invention advantageously makes it possible to obtain a cuff that has two distinct zones of different rigidities so as to optimize a flexible part located in the region of the flaps 25 to favour putting the boot on and comfort, and a more rigid rear zone that holds the leg firmly and prevents the cuff from deforming backwards when moving around on skis.

In all these methods of manufacture making it possible to obtain the products illustrated, the various envisaged injection points receive two successive injections according to the principle of co-injection moulding. The first material is injected simultaneously through the various injection points and then, after a very short space of time, the second material is injected simultaneously through the same injection points in order to achieve the co-injection. As an alternative, the co-injection may be used on at least one injection point, the other injection points then receiving only one injected material alone, or permit the use of any other injection-moulding technique known from the prior art.

The invention also relates to an element or boot of which the wall comprises at least two different plastics materials, of which a first zone 11, comprising the two different plastics materials within its thickness, the first plastics material occupying the external face of the wall, visible from the outside of the boot element and the second plastics material being intercalated between two layers of the first plastics material, and a second zone 13 containing only the second plastics material. The first zone 11 therefore contains the first plastics material 15 forming two layers of the wall, constituting the internal and external faces of the said wall, and the second plastics material 16 is interposed between the two layers of the first plastics material 15. Comment: the second material 16 extends continuously from the first zone 11 to the second zone 13, within the wall of the element, even though it is not visible at the first zone.

According to one embodiment, the boot element comprises an intermediate third zone in which the two materials are mixed, appearing alternately and irregularly, or in a mixed manner, on the visible external surface of the wall of the element. This intermediate third zone is situated between the first zone consisting of a sandwich structure and the second zone consisting only of the second material. Thus, the element may comprise a fourth zone in which the wall contains only the first material, located in particular around the thin edges of the element.

According to another alternative form of embodiment, the boot element may comprise more than two injected plastics materials, a third material for example being injection overmoulded onto the co-injection moulded assembly described above. Moreover, three materials could be co-injection moulded to form a zone made up of a sandwich formed of five layers, then a zone made up of a sandwich formed of three layers, followed by a single-material zone, this single-material zone forming the central part of each of the sandwiches. Embodiments comprising N materials may be envisaged according to the same principle.

The concept of the invention may of course be implemented for any boot element, of the lower shell or cuff type as described, but also for the sole, strap or buckle arrangement, tongue intended for a shell or for a comfort inner boot, heel reinforcement for a cross-country skiing ski boot, or other plastic components which require, in places, either high rigidity or good flexibility. In particular, in the case of a tongue, the flexible part would preferably be positioned in the lower part of the tongue, in the instep region, and therefore formed by the second material, while the more rigid upper part in the region of the shin would be formed by the sandwich made up of the first and second materials. The invention also relates to any sports shoe or boot incorporating such an element. This sports shoe or boot may be any item of footwear for a sliding sport, such as a ski boot, an ice skate, etc. Finally, the various alternative forms described hereinabove may be combined.

The method according to the invention advantageously makes it possible to manufacture a series of sports boots of different appearances, making it possible in particular to see the zones of different rigidity of the boot. The invention has been described in connection with the use of a first material that is more rigid than the second material, but the reverse may be envisaged for creating new elements.

The method according to the invention advantageously makes it possible to manufacture a series of sports boots with a different level of performance using one and the same mould, because all that is required is a minor modification to the co-injection moulding parameters and in particular to the quantities of first and second material and/or the materials chosen in order to obtain a multitude of results that differ from the viewpoint of rigidity.

The mould may be locally heated in order to keep the materials injected in a fluid state and better control their distribution through the element. Conversely, it is possible for the mould to be cooled locally.

The invention thus makes it possible to increase the rigidity of certain zones that require high rigidity, while at the same time maintaining a good level of flexibility in other zones. This then yields boot elements exhibiting the best compromise between rigidity and flexibility.

Finally, the solution according to the invention therefore offers the following advantages:
- co-injection moulding makes it possible to obtain a result that is satisfactory in terms of performance, forming flexible parts and rigid parts in chosen zones of the wall of a sports boot element;
- it also makes it possible to obtain original, varied and attractive aesthetic appearances;
- it can be implemented easily, allowing the rapid and low-cost manufacture of a sports boot element, particularly by reducing the number of injection moulds used.

The invention claimed is:

1. A sports boot element having a wall, wherein the wall comprises:
   at least first and second different co-injection moulded plastics materials that are injected into a same mould via at least one same injection point through which the at least first and second different co-injection moulded plastics materials pass in succession,
   a first zone of the wall comprising the first and second different plastics materials within its thickness, the first plastics material forming two layers of the wall constituting an internal face of the wall facing inside of the boot and an external face of the wall opposite the internal face of the wall, and the second plastics material being interposed between the two layers of the first plastics material, a second zone of the wall comprising only the second plastics material within its entire thickness from the internal face of the wall to the external face of the wall, wherein the first material and the second material are different type plastic materials, wherein the first plastics material is more rigid than the second plastics material, and wherein the first zone includes at least one region within the group consisting of a rear part and a lower part of the sports boot element, and wherein the second zone includes at least one region within the group consisting of a frontal part, a flap and an instep of the sports boot element.

2. The sports boot element according to claim 1, wherein the second material extends continuously from the first zone to the second zone.

3. The sports boot element according to claim 2, wherein an outer visible external surface of the wall comprises at least one selected from the group consisting of (i) an irregular, non-smooth frontier between the first and second zones and (ii) an intermediate zone comprising at least one selected from the group consisting of a mixture of the first and second plastics materials and an alternation of the first and second plastics materials.

4. The sports boot element according to claim 1, wherein the first plastics material represents 50% or less of the total weight of the boot element.

5. The sports boot element according to claim 1, wherein at least one selected from the group consisting of (i) the more rigid first plastics material has a hardness in a range from 50 to 70 shore D hardness, and (ii) the more flexible second plastics material has a hardness in a range from 40 to 60 shore D hardness.

6. The sports boot element according to claim 1, wherein the more rigid first plastics material forms at least a wall of curbs of the boot element suited to collaborating with jaws of a ski boot binding device.

7. The sports boot element according to claim 1, which is a lower shell.

8. The sports boot element according to claim 7, wherein the lower shell has a more rigid first zone at least one selected from the group consisting of (i) a rear part and (ii) a lower part of the lower shell, and has a more flexible second zone in a region of at least one selected from the group consisting of flaps and an instep.

9. The sports boot element according to claim 8, wherein the lower shell has an alternation of more rigid first zones and of more flexible second zones in the lower part of the lower shell, more rigid first zones being positioned in a region of curbs and in a middle part of the lower shell.

10. The sports boot element according to claim 1, which is a sports boot cuff.

11. The sports boot element according to claim 10, wherein the sports boot cuff has a more rigid first zone in a rear part and has a more flexible second zone in a region of lateral flaps.

12. A sports boot, which comprises at least one element according to claim 1.

13. A method for manufacturing a sports boot element, comprising:

injecting a first plastics material in a mould, not occupying an entire surface of the mould;

injecting into the same mould a second plastics material, different from the first plastics material, after the injection of the first plastics material and before the first plastics material has completely hardened, using a co-injection moulding principle, so as to obtain the sports boot element having a wall comprising at least first and second different co-injection moulded plastics materials that are injected into a same mould via at least one same injection point through which the at least first and second different co-injection moulded plastics materials pass in succession, wherein the wall further comprises:

a first zone of the wall comprising the first and second different plastics materials within its thickness, the first plastics material forming two layers of the wall constituting an internal face of the wall facing inside of the boot and an external face of the wall opposite the internal face of the wall, and the second plastics material being interposed between the two layers of the first plastics material, a second zone of the wall comprising only the second plastics material within its entire thickness from the internal face of the wall to the external face of the wall, wherein the first material and the second material are different type plastic materials, wherein the first plastics material is more rigid than the second plastics material, and wherein the first zone includes at least one region within the group consisting of a rear part and a lower part of the sports boot element, and wherein the second zone includes at least one region within the group consisting of a frontal part, a flap and an instep of the sports boot element.

14. A method for manufacturing a sports boot element, comprising:

co-injection moulding first and second plastics materials from at least one selected from the group consisting of (i) two injection points located at two distinct points of a mould intended for the manufacture of a lower shell of a ski boot, the two points being positioned at two different heights at a rear part of the lower shell, and (ii) at least two injection point located at several distinct points of a mould intended for the manufacture of a ski boot lower shell, the various injection points being positioned underneath a sole of the lower shell, so as to obtain the sports boot element which is a lower shell having a wall comprising at least first and second different co-injection moulded plastics materials that are injected into a same mould via at least one same injection point through which the at least first and second different co-injection moulded plastics materials pass in succession, wherein the wall further comprises:

a first zone of the wall comprising the first and second different plastics materials within its thickness, the first plastics material forming two layers of the wall constituting an internal face of the wall facing inside of the boot and an external face of the wall opposite the internal face of the wall, and the second plastics material being interposed between the two layers of the first plastics material, a second zone of the wall comprising only the second plastics material within its entire thickness from the internal face of the wall to the external face of the wall, wherein the first material and the second material are different type plastic materials, wherein the first plastics material is more rigid than the second plastics material, and wherein the first zone includes at least one region within the group consisting of a rear part and a lower part of the sports boot element, and wherein the second zone includes at least one region within the group consisting of a frontal part, a flap and an instep of the sports boot element.

15. The method for manufacturing a sports boot element according to claim 14, comprising co-injection moulding the first and second plastics materials using at least three injection points located at at least three distinct points of the mould, shell, the various injection points being positioned underneath the sole of the lower shell, at least two of the injection points being positioned respectively in a region of a front and in a region of a rear curb of the lower shell.

16. A method for manufacturing a sports boot element, comprising:

co-injection moulding first and second plastics materials using two or three injection points located at several distinct points of a mould intended for the manufacture of a ski boot cuff, the various points being positioned at different heights in a rear part of the cuff, so as to obtain the sports boot element according to claim 10.

17. A method for manufacturing a sports boot, comprising at least one selected from the group consisting of (i) co-injection moulding first and second plastics materials using same injection points and (ii) co-injection moulding involving injecting a second plastics material through a first plastics material, so as to obtain the sports boot according to claim 12.

18. The sports boot element according to claim 1, wherein the first plastics material represents 40% or less of the total weight of the boot element.

19. The sports boot element according to claim 1, wherein the first plastics material represents 30% or less of the total weight of the boot element.

20. The sports boot element according to claim 1, wherein, in the first zone, the second material is not visible from the outside of the boot element and not visible from the inside of the boot element.

21. The sports boot element according to claim 1, wherein the second plastics material has a different composition than the first plastic material.

22. The sports boot element according to claim 1, wherein the co-injection moulded first and second materials are in an imbricated state in which the second material partially penetrates a layer of the first material and in which the second material has carried part of the first material creating an intermediate zone between the first and second materials having no clean or linear frontier, wherein the first material is formed from a first injection and the second material is formed from a second injection performed after the first injection.

23. The sports boot element according to claim 22, wherein the co-injection moulded first and second materials are in the imbricated state from the second injection performed when the first material from the first injection was in a liquid or fluid state.

24. The sports boot element according to claim 1, wherein the first material has a higher hardness or a higher Young's modulus than the second material.

25. The sports boot element according to claim 1, wherein the first material and the second material are both plastic materials.

26. The sports boot element according to claim 1, wherein the first zone of the wall comprises the first and second different plastics materials within its entire thickness.

* * * * *